United States Patent
Barnum et al.

(10) Patent No.: US 10,877,623 B2
(45) Date of Patent: Dec. 29, 2020

(54) DYNAMIC INTERFACE FOR REMOTE CONTROL OF A HOME AUTOMATION NETWORK

(75) Inventors: Wally Barnum, Salt Lake City, UT (US); Joe Doubek, Cottonwood Heights, UT (US)

(73) Assignee: WirePath Home Systems, LLC, Salt Lake City, UT (US)

( * ) Notice: Subject to any disclaimer, the term of this patent is extended or adjusted under 35 U.S.C. 154(b) by 1651 days.

(21) Appl. No.: 12/139,356

(22) Filed: Jun. 13, 2008

(65) Prior Publication Data

US 2008/0313566 A1 Dec. 18, 2008

Related U.S. Application Data

(60) Provisional application No. 60/944,753, filed on Jun. 18, 2007.

(51) Int. Cl.
*G06F 3/0482* (2013.01)
*H04L 12/28* (2006.01)

(52) U.S. Cl.
CPC .......... *G06F 3/0482* (2013.01); *H04L 12/281* (2013.01); *H04L 12/2816* (2013.01); *G08C 2201/20* (2013.01); *G08C 2201/30* (2013.01)

(58) Field of Classification Search
CPC .... G09G 5/14; H04N 5/44591; G06F 3/0481; G06F 3/0483; G06F 9/4443; H04L 12/281; H04L 12/2816; G08C 2201/20; G08C 2201/30
USPC .......................................... 715/810, 764, 709
See application file for complete search history.

(56) References Cited

U.S. PATENT DOCUMENTS

| | | | |
|---|---|---|---|
| 3,878,377 | A | 4/1975 | Brunone |
| 3,909,826 | A | 9/1975 | Schildmeier et al. |
| 4,040,060 | A | 8/1977 | Kaloi |
| 4,068,289 | A | 1/1978 | Ferrigno |
| 4,138,684 | A | 2/1979 | Kerr |
| 4,163,218 | A | 7/1979 | Wu |
| 4,186,381 | A | 1/1980 | Fleischer et al. |
| 4,222,564 | A | 9/1980 | Allen et al. |
| 4,322,842 | A | 3/1982 | Martinez |
| 4,334,171 | A | 6/1982 | Parman et al. |
| 4,393,277 | A | 7/1983 | Besen et al. |
| 4,418,333 | A | 11/1983 | Schwarzbach et al. |
| 4,511,887 | A | 4/1985 | Fiore |

(Continued)

FOREIGN PATENT DOCUMENTS

| | | |
|---|---|---|
| EP | 0 513 443 | 11/1992 |
| EP | 0 513 688 | 11/1992 |

OTHER PUBLICATIONS

Depositon of Bill Nuffer, CPP, Apr. 30, 2005, pp. 1-49.
Anova Control Center, Operators Manual, pp. 1-50.

*Primary Examiner* — Arpan P. Savla
*Assistant Examiner* — Erik V Stitt
(74) *Attorney, Agent, or Firm* — Austin Rapp

(57) ABSTRACT

A home automation network system having an automation controller and a remote control is described. The automation controller can dynamically download extracts from a menu database to the remote control as a user navigates through the menus. Downloading can be based on remote control configuration parameters communicated to the automation controller. Menus can be selected based on display limitations and input control types available on the remote control.

26 Claims, 8 Drawing Sheets

(56) References Cited

U.S. PATENT DOCUMENTS

| | | |
|---|---|---|
| 4,524,288 A | 6/1985 | Schimmelpennink et al. |
| 4,527,247 A | 7/1985 | Kaiser et al. |
| 4,636,791 A | 1/1987 | Burke et al. |
| 4,644,320 A | 2/1987 | Carr et al. |
| 4,703,306 A | 10/1987 | Barrit |
| 4,706,274 A | 11/1987 | Baker et al. |
| 4,755,792 A | 7/1988 | Pezzolo et al. |
| 4,764,981 A | 8/1988 | Miyahara et al. |
| 4,768,218 A | 8/1988 | Yorita |
| 4,823,069 A | 4/1989 | Callahan et al. |
| 4,825,209 A | 4/1989 | Sasaki et al. |
| 4,829,554 A | 5/1989 | Barnes et al. |
| 4,864,588 A | 9/1989 | Simpson et al. |
| 4,873,711 A | 10/1989 | Roberts et al. |
| 4,881,259 A | 11/1989 | Scordato |
| 4,889,999 A | 12/1989 | Rowen |
| 4,896,370 A | 1/1990 | Kasparian et al. |
| 4,908,604 A | 3/1990 | Jacob |
| 4,918,432 A | 4/1990 | Pauley et al. |
| 4,918,717 A | 4/1990 | Bissonnette et al. |
| 4,928,778 A | 5/1990 | Tin |
| 4,939,792 A | 7/1990 | Urbish et al. |
| 4,940,964 A | 7/1990 | Dao |
| 4,977,529 A | 12/1990 | Gregg et al. |
| 4,996,703 A | 2/1991 | Gray |
| 5,017,837 A | 5/1991 | Hanna et al. |
| 5,051,720 A | 9/1991 | Kittirutsunetorn |
| 5,079,559 A | 1/1992 | Umetsu et al. |
| 5,086,385 A | 2/1992 | Launey et al. |
| 5,089,974 A | 2/1992 | Demeyer et al. |
| 5,099,193 A | 3/1992 | Moseley et al. |
| 5,109,222 A | 4/1992 | Welty |
| 5,146,153 A | 9/1992 | Luchaco et al. |
| 5,173,855 A | 12/1992 | Nielsen et al. |
| 5,191,265 A | 3/1993 | D'Aleo et al. |
| 5,218,344 A | 6/1993 | Ricketts |
| 5,218,628 A | 6/1993 | Ito |
| 5,224,648 A | 7/1993 | Simon et al. |
| 5,237,264 A | 8/1993 | Moseley et al. |
| 5,321,736 A | 6/1994 | Beasley |
| 5,348,078 A | 9/1994 | Dushane et al. |
| 5,359,625 A | 10/1994 | Vander Mey et al. |
| 5,382,947 A | 1/1995 | Thaler et al. |
| 5,386,209 A | 1/1995 | Thomas |
| 5,400,041 A | 3/1995 | Strickland |
| 5,400,246 A | 3/1995 | Wilson et al. |
| 5,426,439 A | 6/1995 | Grossman |
| 5,455,464 A | 10/1995 | Gosling |
| 5,495,406 A | 2/1996 | Kushiro et al. |
| 5,530,322 A | 6/1996 | Ferrence et al. |
| 5,544,036 A | 8/1996 | Brown, Jr. et al. |
| 5,565,855 A | 10/1996 | Knibbe |
| 5,570,085 A | 10/1996 | Bertsch |
| 5,572,438 A | 11/1996 | Ehlers et al. |
| 5,574,748 A | 11/1996 | Vander Mey et al. |
| 5,598,039 A | 1/1997 | Weber |
| 5,736,965 A | 4/1998 | Mosebrook et al. |
| 5,778,372 A * | 7/1998 | Cordell et al. |
| 5,793,300 A | 8/1998 | Suman et al. |
| 5,798,581 A | 8/1998 | Keagy et al. |
| 5,905,442 A | 5/1999 | Mosebrook et al. |
| 5,982,103 A | 11/1999 | Mosebrook et al. |
| 6,127,941 A | 10/2000 | Van Ryzin |
| 6,253,114 B1 * | 6/2001 | Takihara ............ G11B 27/002 700/17 |
| 6,341,316 B1 * | 1/2002 | Kloba et al. .................. 709/248 |
| 6,661,437 B1 | 12/2003 | Miller et al. |
| 6,687,487 B1 | 2/2004 | Mosebrook et al. |
| 6,791,467 B1 | 9/2004 | Ben-Ze'ev |
| 6,803,728 B2 | 10/2004 | Balasubramaniam |
| 6,983,424 B1 * | 1/2006 | Dutta ................. G06F 3/04817 715/790 |
| 7,009,528 B2 | 3/2006 | Griep |
| 7,020,881 B2 * | 3/2006 | Takahashi ............ G06F 3/0481 348/E5.102 |
| 7,032,176 B2 | 4/2006 | Gordon et al. |
| 7,032,181 B1 * | 4/2006 | Farcasiu ......... H04M 1/274516 455/566 |
| 2001/0026291 A1 | 10/2001 | Uchida |
| 2001/0030667 A1 * | 10/2001 | Kelts ............................ 345/854 |
| 2002/0171763 A1 | 11/2002 | Stecyk et al. |
| 2003/0048295 A1 * | 3/2003 | Lilleness et al. ............. 345/738 |
| 2003/0103088 A1 * | 6/2003 | Dresti et al. ................. 345/835 |
| 2003/0169289 A1 * | 9/2003 | Holt et al. ................... 345/735 |
| 2004/0230572 A1 * | 11/2004 | Omoigui ............ G06F 16/3338 |
| 2005/0027539 A1 * | 2/2005 | Weber ................... G08C 17/00 704/275 |
| 2005/0044164 A1 * | 2/2005 | O'Farrell et al. ............. 709/213 |
| 2005/0210057 A1 * | 9/2005 | Sprague ............... G06F 16/957 |
| 2006/0158438 A1 * | 7/2006 | Hunter ......................... 345/173 |
| 2006/0161865 A1 * | 7/2006 | Scott et al. ................... 715/810 |
| 2007/0186182 A1 * | 8/2007 | Schiller ....................... 715/781 |
| 2013/0009900 A1 * | 1/2013 | Pryor ..................... B60K 35/00 345/173 |
| 2015/0067738 A1 * | 3/2015 | Lilleness ............. G06F 3/0488 725/58 |

* cited by examiner

DYNAMIC INTERFACE FOR REMOTE CONTROL OF A HOME AUTOMATION NETWORK

CROSS-REFERENCE TO RELATED APPLICATIONS AND CLAIM OF PRIORITY

Priority of U.S. Provisional patent application Ser. No. 60/944,753 filed on Jun. 18, 2007 is claimed.

BACKGROUND

Home automation networks have become increasingly popular. Home automation networks can incorporate diverse elements, such as security system components, environmental controls, lighting controls, and audio/visual equipment. While users enjoy the ability to control a wide variety of components, the necessary remote control devices can become very complex. With complexity comes cost and difficulties in upgrading and maintaining the controls.

For example, various so-called universal remote control devices are known in the art for audio/visual control, typically using infrared interfaces. These universal remote control devices typically include a large database of control codes for controlling audio/visual equipment such as DVD players, VCRs, televisions, stereo receivers, home theatre systems, and the like. The large database may be preprogrammed, making it difficult to update the universal remote control to accommodate new devices which become available.

Some universal remote controls can be programmed to learn new control codes. For example, the devices can be connected to the Internet through a computer in order to download new control codes for new devices. Other devices can be programmed with new codes using the original remote control provided with the device. Although devices can be updated to accommodate new system components, reprogramming the remote control is cumbersome for a user.

Most universal remote control devices are targeted at audio/visual control, and do not typically include the ability to control other equipment, such as environmental or lighting controls. The devices also typically have a number of buttons which are allocated to fixed functions, such as volume control, input selection, channel changing, and the like.

When a large number of devices are to be controlled by the remote control device, the remote control can become quite complex. Some remote control devices include a very large number of buttons, which can be visually undesirable as well as drive up costs for the packaging of the device.

For a complex home automation network, it is often desirable to provide multiple remote controls, some portable and some in fixed locations. For example, a remote control may be mounted at a wall location where it is primarily used for controlling lighting. Another remote control may be mounted near a door where it is primarily used for security system control. Using a universal type remote control at each location can be cost prohibitive. While less expensive, single purpose controls can be provided, they may not be able to provide all of the desired user functions.

SUMMARY

In one embodiment of the invention, a method of operating a remote control includes communicating remote control configuration parameters from the remote control to an automation controller. The method can also include dynamically receiving database extracts from the automation controller at the remote control in response to menu navigation by the user. The database extracts can define user interface elements which are displayable on a display of the remote control, consistent with the remote control configuration parameters.

In another embodiment of the invention, a method of control in a home automation network includes communicating remote control capacity parameters from a remote control to an automation controller. Another step of the method is downloading menu items from the automation controller to the remote control, where the number and length of the menu items is selected by the automation controller based on the remote control capacity parameters. The method can also include displaying menu items on a display of the remote control and downloading additional menu items in response to user navigation commands.

Another embodiment of the invention includes a home automation network having an automation controller. The automation controller is coupled to a plurality of home automation network components. A menu database is accessible to the automation controller and defines user-navigable control menus for control of the home automation network. A remote control is in communication with the automation controller and can dynamically download portions of the menu database in response to a user navigating through the menu database using the remote control.

Additional embodiments of the invention include an automation controller having means for extracting and communicating menu items to a remote control in response to requests from the remote control, and a remote control having means for dynamically downloading a limited number of menu items of a limited length from an automation controller as a user navigates through a displayed menu.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
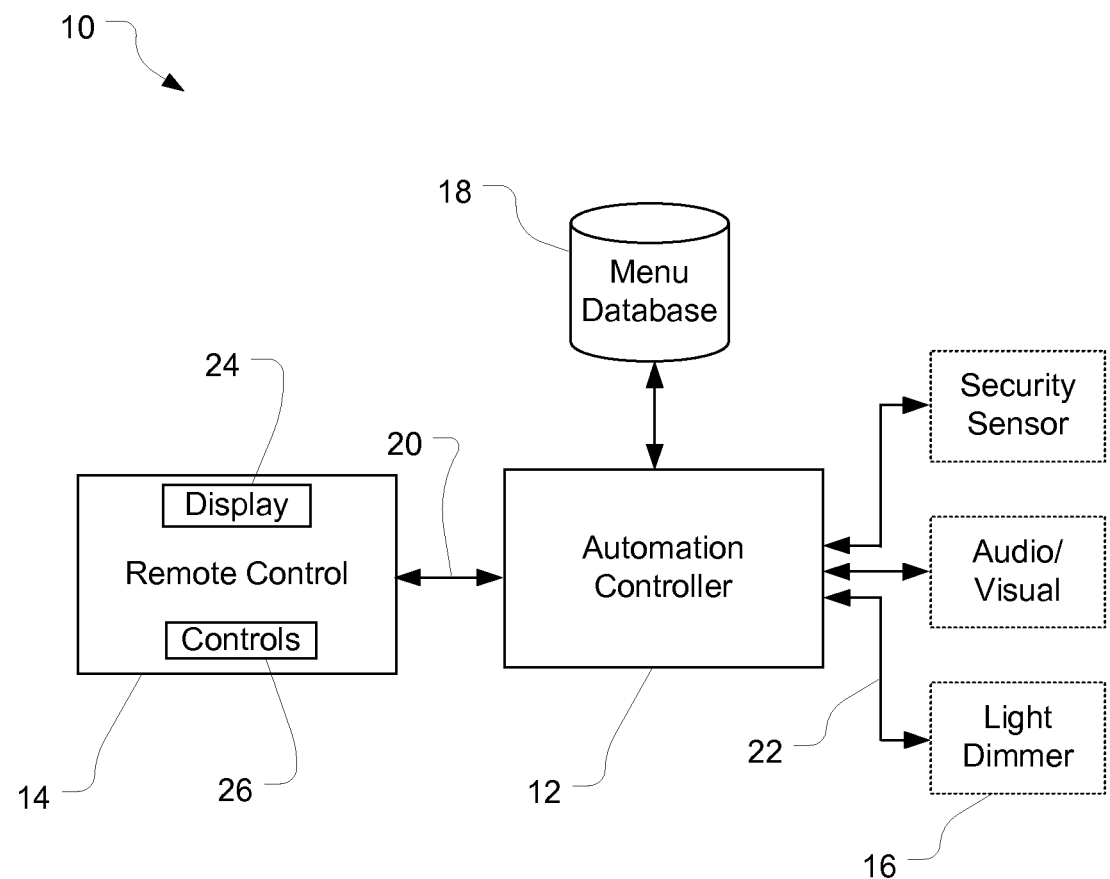
FIG. 1 is a block diagram of a home automation network in accordance with an embodiment of the present invention.

FIG. 1 provides a block diagram of a home automation network in accordance with an embodiment of the present invention. The home automation network, shown generally at 10, includes an automation controller 12 and a remote control 14. The automation controller provides control of various home automation network components 16, including for example, lighting dimmers and switches, audio/visual equipment, climate control, and the like. A menu database 18, accessible to the automation controller, defines displayable user interface elements to allow user control of the home automation network. Displayable user interface elements can include, for example, displayable menu items, displayable virtual controls, and control function mapping, as described further herein. The menu database may, for example, be stored in memory in the automation controller as discussed further below.

The remote control 14 is in communication with the automation controller 12. The remote control is arranged to dynamically download limited portions of the menu database from the automation controller in response to a user navigating through the menu database using the remote control.

For example, the communication link 20 between the automation controller 12 and the remote control 14 can be a wireless communication link. The automation controller and the remote control can each include a wireless transceiver to form a wireless network as described further below. Communication 22 from the automation controller to some or all of the home automation network components 16 can also be via the wireless network.

The remote control 14 can request the limited portions of the menu database 18 from the controller based on which menu items will need to be displayed to a user on a display 24 located on the remote control. For example, the remote control may request menu items that are not currently being displayed, but which are adjacent to a displayed menu item and thus might be scrolled to by a user using controls 26 located on the remote control. The limited portions of the menu database can be based on memory or display limitations of the remote control.

Figure 2:
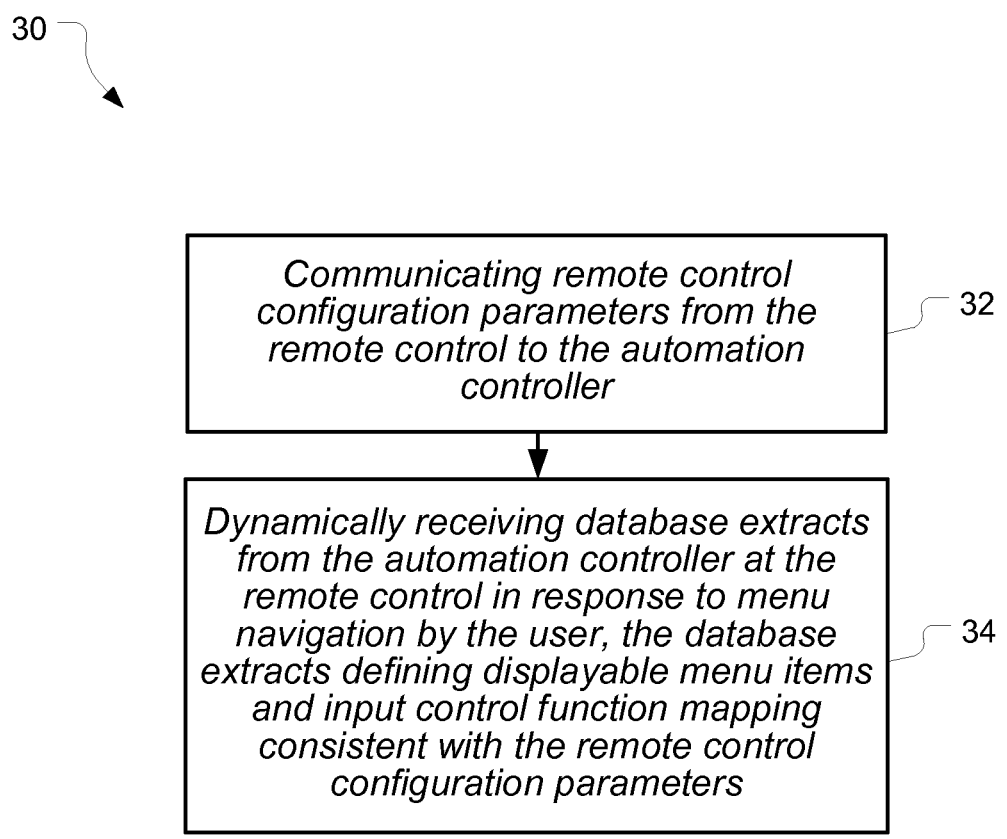
FIG. 2 is a flow chart of the method of remote control in a home automation network in accordance with an embodiment of the present invention.

Various protocols can be used to implement the downloading of limited portions of the menu database. For example, FIG. 2 illustrates a flow chart for a method of operating a remote control. The method, shown generally at 30, includes communicating 32 remote control configuration parameters from the remote control to the automation controller. For example, remote control configuration parameters can include remote control capacity limits, such as display capacity limits, display width limit (e.g. in pixels or text characters), display height limit (e.g. in pixels or text lines), or the like. Remote control configuration parameters can also include a list of available physical controls (e.g. buttons, sliders, knobs) on the remote or stored virtual controls (e.g. touch screen implemented buttons and sliders), and similar items.

Communicating these configuration parameters allows the automation controller to adapt the menu items communicated to the remote control to the capabilities of the remote control. For example, a given menu item may be displayable as a short text using abbreviations, a long text, or a graphical image. The central controller can select which version of a given menu item to provide to the remote control that is consistent with the remote control configuration parameters. For example, a remote control which has a 30 character wide display might be provided with short text versions of the menu items, while a remote control which has a larger display might be provided a longer text version. In other words, the number of menu items, and a length of each menu can be selected by the automation controller based on the dynamically communicated remote control capacity limits.

The method 30 can include dynamically receiving 34 database extracts from the automation controller at the remote control in response to menu navigation by the user. For example, as a user navigates through the menu, the menu item list may be scrolled on the display or new lists displayed. Rather than requiring the remote control to include memory for all of the possible menu items as the user navigates the menu, the menu items can be dynamically downloaded from the automation controller to the remote control. For example, a remote control with 4 lines of menu display may have a memory large enough for 6 menu items: the 4 being displayed plus 1 menu item above and 1 menu item below the currently displayed items. This can help to provide for rapid display updates as the user scrolls through the menu, since while the menu display is being updated, new menu items can be received and stored into memory. As another example, a remote control having only enough memory for one displayed menu item, may receive menu items for immediate display. Newly received menu items may replace menu items currently in memory.

Downloaded menu items may also include various user control definitions for physical or virtual controls available on the remote control. For example, a user may control the volume of an audio component through the remote control. Upon selecting the component to be controlled and the parameter (volume) being adjusted, the remote control may activate a control specified by the menu database. Various controls may be present on the remote control, including physical controls such as sliders, push buttons, toggle switches, rotary knobs. Virtual controls can also be included, for example implemented using a touch sensitive screen to provide touch sliders, touch switches, touch knobs, and the like. Multiple controls may be present on the remote control. The remote control configuration parameters can include control type identifier(s) to identify the type(s) of control(s) available on the remote control.

Extracts from the database downloaded to the remote control may define function mapping for the input controls on the remote control. For example, when the user selects a volume adjustment, a slider control may be activated when the remote control has a slider control. If no slider control is available, push buttons may be mapped to "volume up" and "volume down" functions. These different options can be defined in the menu database, and selected based on the remote control configuration. Because the automation controller is aware of the remote control configuration parameters, function mapping of input controls can be made accordingly.

Operation of the method will be described in further detail with reference to FIGS. 3a through 3d, which illustrates a series of simulated display screens on a remote control 40 as a user navigates a set of exemplary menus and in conjunction with FIGS. 4a and 4b which illustrate a protocol flow diagram showing one possible implementation of message exchanges between the automation controller and the remote control used to dynamically download the menu information. In the protocol flow diagrams of FIGS. 4a and 4b, time progresses downward. The remote control is represented by a vertical line to the left of the diagram and the automation controller is represented by a vertical line to the right of the diagram. Message flow is shown by the slanted lines between the vertical lines, corresponding to messages between the remote control and automation controller.

Figure 3A:
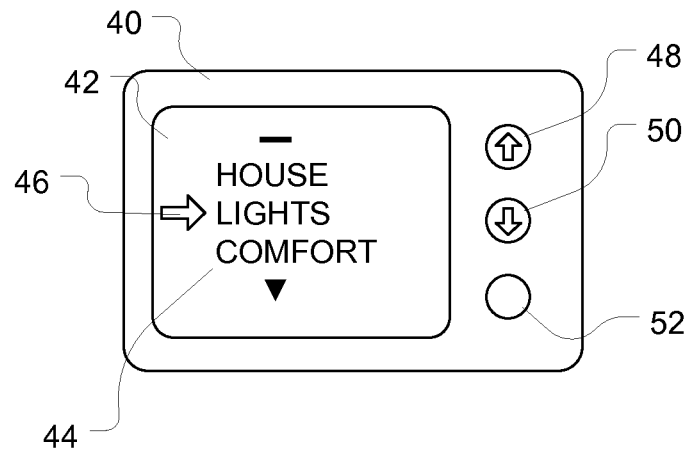
FIGS. 3a through 3d are illustrations of a remote control display in accordance with an embodiment of the present invention.
Figure 4A:
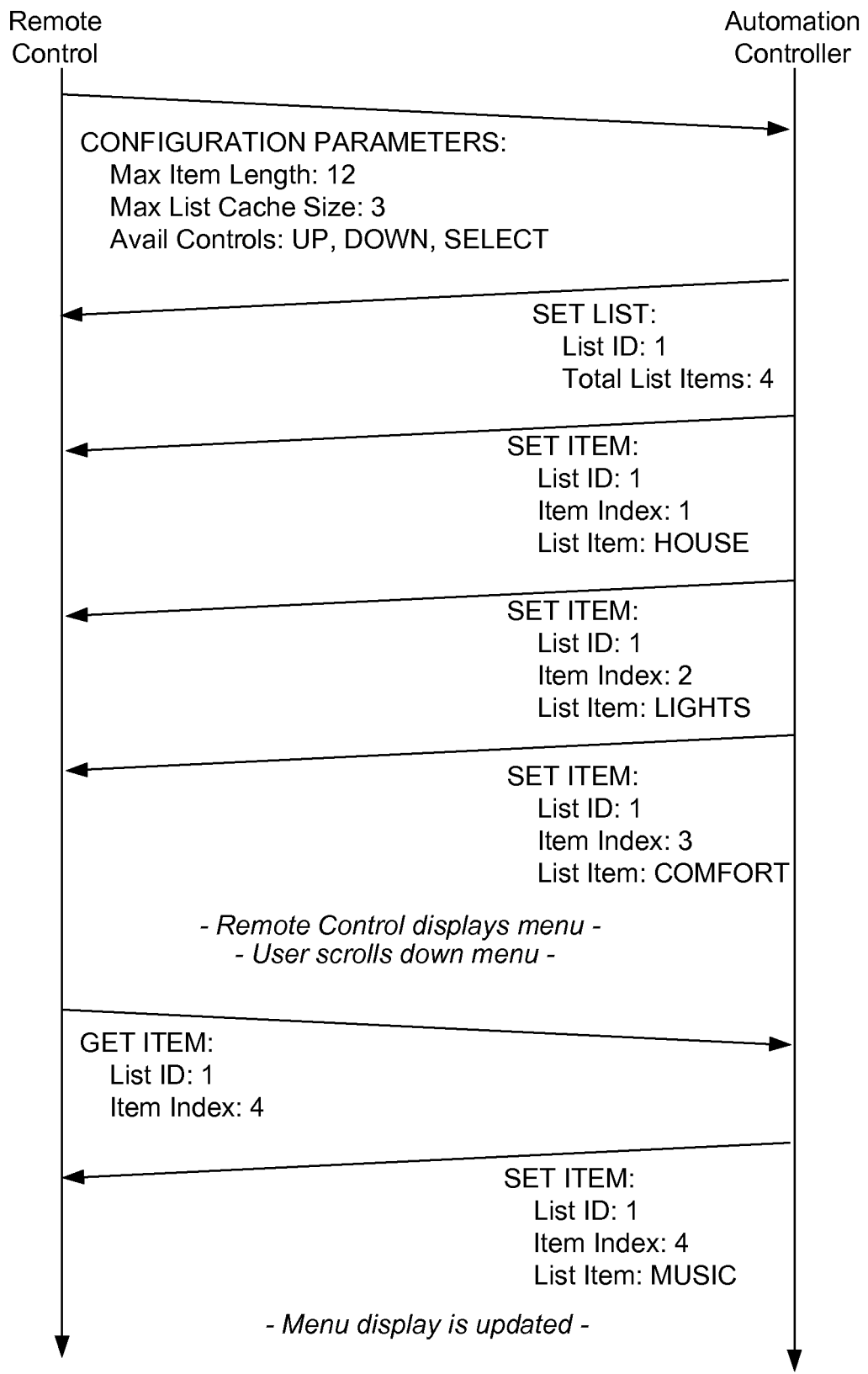
FIGS. 4a and 4b are protocol flow diagrams of message exchange between a remote control and an automation controller in accordance with an embodiment of the present invention.
Figure 4B:
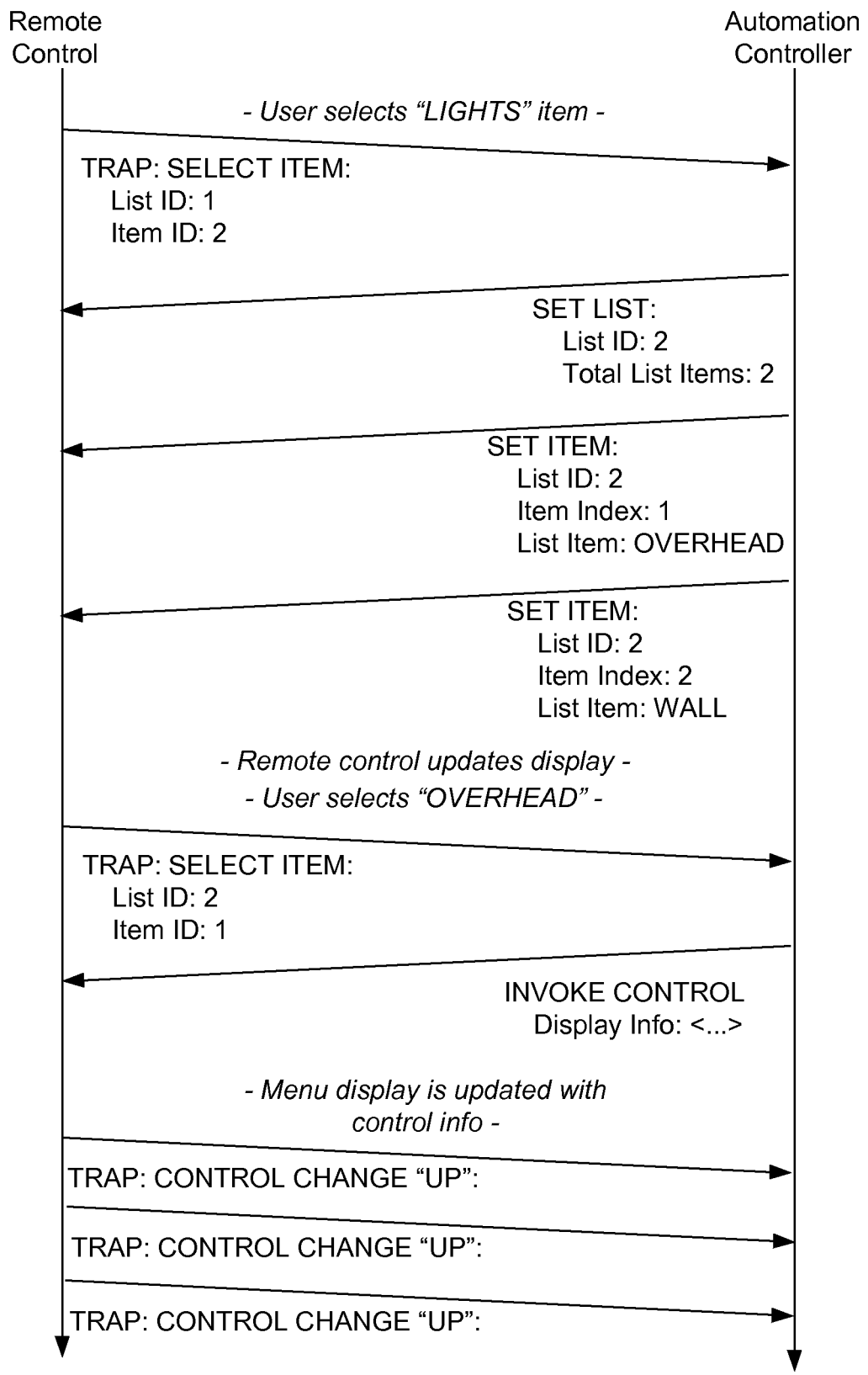

FIG. 3a illustrates a first menu on the display 42, where the user is presented a top level selection-type menu 44. The menu information is obtained as shown in FIG. 4a. The protocol sequence begins by the remote control communicating configuration parameters to the automation controller using a CONFIGURATION PARAMETER message. These configuration parameters are used by the automation controller to determine the particular menu items and how many menu items to extract from the database and transmit to the remote control. The automation controller can inform the remote control about the menu list (e.g. how many items) using a SET LIST message, and can then populate a portion of the list on the remote control using SET ITEM messages. The number of items populated in the list may be less than the total list length, consistent with the memory limitations of the remote control. In this example, the top level menu has four items, of which the first three "HOUSE", "LIGHTS", and "COMFORT" are sent to the remote control. The remote control then displays the menu as shown in FIG. 3a.

The user can navigate the menu, for example by moving a cursor 46 up and down the displayed menu, or by scrolling the menu, using the up control 48 and down control 50. In other words, the up control and down control are function mapped to a menu navigation function. Various other ways of displaying and navigating a menu list are possible and can be used in embodiments of the present invention.

Figure 3B:
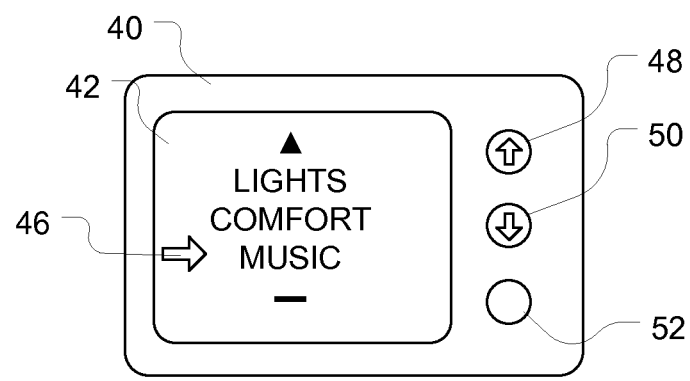

By moving down to the bottom of the list, the menu list 44 may scroll on the display 42 to show an additional menu item "MUSIC" as illustrated in FIG. 3b. This additional menu item may be automatically received by the remote controller from the automation controller in response to the user menu navigation. For example, downloading of new menu items can be initiated by the remote controller sending a request to the automation controller, and the automation controller responding by sending the menu item to the remote control. The bottom portion of FIG. 4a illustrates this exchange, where the remote control initiates transfer with a GET ITEM message, to which the automation controller responds with a SET ITEM message providing menu item 4, "COMFORT".

As a user scrolls through the menu, the remote control may then request additional menu items from the automation controller using the GET ITEM message. New menu list items may overwrite menu items already in memory. As the user scrolls through the menu, depending on how much cache memory is available in the remote control as compared to the menu list length, the remote control may make a number of requests for new menu items from the automation controller. While the above example is a simple illustration, it should be appreciated that this technique can be valuable when a large number of menu items are available. For example, when browsing a music collection many hundreds of titles may be available that greatly exceeds the limited memory capacity within the remote control. Hence, the remote control can download, store, and display a limited subset of the titles, downloading additional titles and updating the display as the user scrolls through the selections. Accordingly, the technique scales nicely, allowing menus having a wide range of lengths to be handled consistently.

Figure 3C:
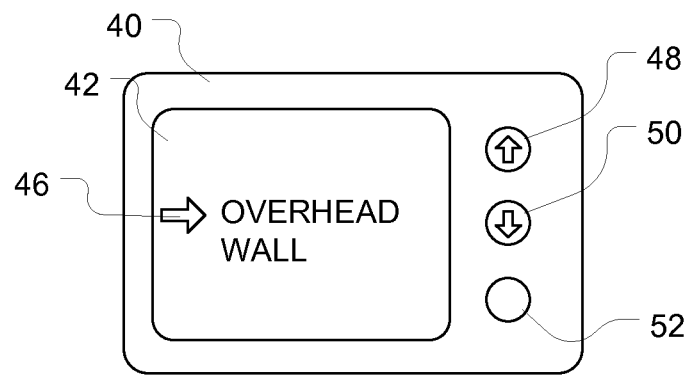

Continuing the example, the user may scroll back to the menu item "LIGHTS" and select that menu item by pressing the blank control 52. In other words, the blank control 52 has been mapped to a menu selection function. For example, by selecting "LIGHTS" the user may be directed to a second menu display while allows selection of various lights in the current room as illustrated in FIG. 3c. Again, these menu items may be received from the automation controller in response to a request by the remote control for menu items from the automation controller. This sequence is illustrated in the top portion of FIG. 4b. Upon user-selection of the LIGHTS item, a TRAP: SELECT ITEM message is sent to the automation controller and new menu selections are provided to the remote control by SET ITEM messages.

Figure 3D:
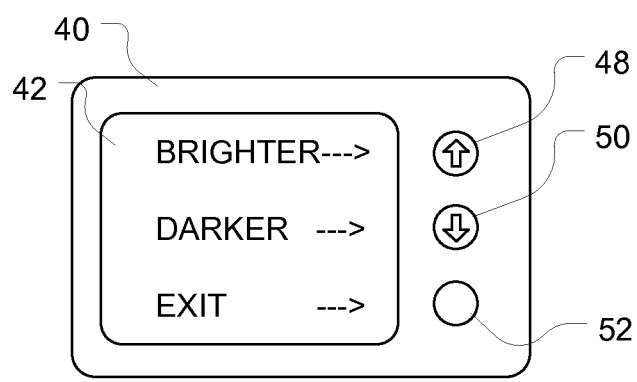

Upon selecting a particular light, e.g. "OVERHEAD" a control-type screen may be presented as illustrated in FIG. 3d. Here, the blank control 52 has been mapped to a control selection function. Upon the user-selection of the particular light being controlled, the TRAP:SELECT ITEM message is sent to the automation controller as shown in the center of FIG. 4b. The automation controller responds with an INVOKE CONTROL message which includes display information (represented by "< . . . " and not shown in detail) for how the display is to appear as shown in FIG. 3d.

The control screen indicates the functions being performed by the input controls, showing that depressing the up key 48 will increase brightness of the overhead lighting and pressing the down key 50 will decrease brightness, and the blank key 52 will exit the control menu. As the up key and down key are pressed, the remote control can communicate these key presses to the automation controller. This can be communicated using TRAP: CONTROL CHANGE messages indicating which button has been pressed to adjust the selected light either up or down in brightness as illustrated in the bottom of FIG. 4b. The automation controller can then, in turn, make the requested changes to the overhead lighting component. The display can also include an indicator showing the current status of the overhead lighting which is updated as the lighting level is changed, for example, using additional lines on the display (not shown).

While the menu items shown in the above example use simple text strings, it should be appreciated than menus can take on a variety of formats. For example, menus can include title elements, graphical elements, multi-level hierarchy, non-hierarchical links, and other known elements.

Figure 5:
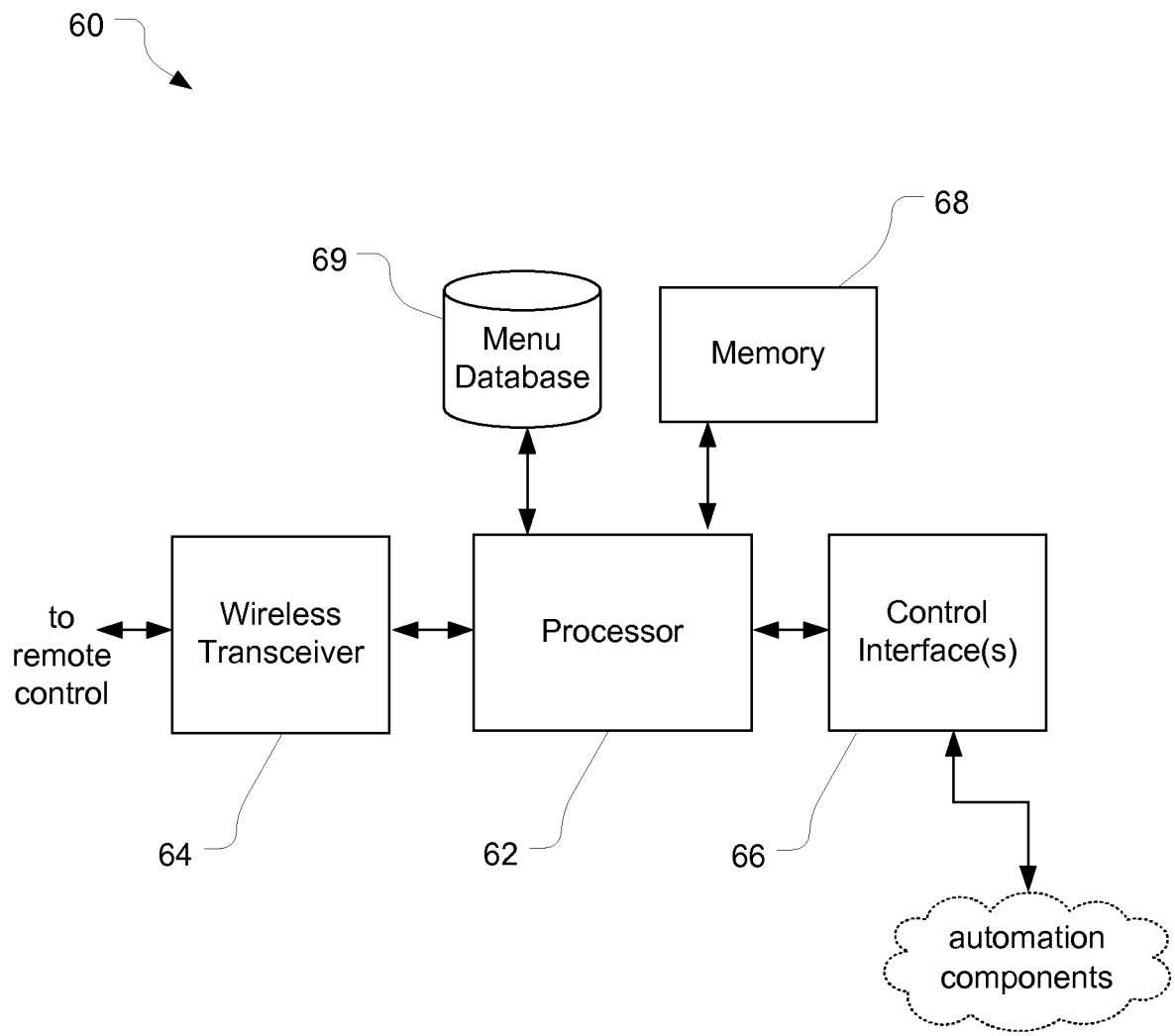
FIG. 5 is a block diagram of a detailed implementation of an automation controller in accordance with an embodiment of the present invention.

Discussion of one exemplary detailed implementation of the automation controller will help to illustrate additional benefits of the present invention. A block diagram of an automation controller is shown in block diagram form in FIG. 5. The automation controller, shown generally at 60, can include a processor 62 which controls overall operation of the automation controller. Various processors are known which can be used in embodiments of the present invention, including for example, microprocessors and microcontrollers. Alternately, the processor may be implemented in logic, for example, using a field programmable gate array (FPGA) or application specific integrated circuit (ASIC). The home automation system may include one or more remote controls in communication with the automation controller. The automation controller includes means for communicating with the remote controller. For example, this means for communicating may be a wireless transceiver 64. Various wireless communications techniques are known which can be used in wireless transceivers, including for example, radio frequency, ultrasonic, optical, infrared, and ultraviolet transmission. Wireless transceivers for various communications techniques are known which can be used in embodiments of the present invention.

A control interface 66 can be included for communication with the automation components. As another option, communication with the automation components can also be via the wireless transceiver 64. The automation controller may also include a memory 68, such as random access memory (RAM), non-volatile RAM, read only memory (ROM), programmable ROM (PROM), erasable programmable ROM (EPROM), flash memory, and combinations of these types of memory and the like. The memory may be used to store the menu database 69, software to implement functions of the automation controller, remote control configuration parameters, and information for control of the automation components. The memory may be provided separately from the processor or included within the processor component.

By maintaining the menu database 69 at the automation controller 60, maintenance and upgrade of the home automation system can be enhanced. For example, as home automation network components are added or removed, menus can be modified to reflect the added or deleted capabilities. The menu database may be edited through a user interface (not shown) provided by the automation controller. As an alternative, the menu database may be updated remotely, such as through an internet connection (not shown) or connection (not shown) to a personal computer. Once the menu database is updated, these updates will be immediately available to remote controls, since the remote controls dynamically download menu items. This helps to avoid needing to separately reprogram the remote control(s) every time a menu update occurs, since updated menu items are automatically downloaded to the remote control when needed for display.

The automation controller 60 also includes means for extracting menu items from the database in response to request from the remote control. The extracted menu items can be in response to requests from the remote control, and the number of menu items and length of menu items based on the remote control capacity limits as described above. Various protocols for downloading menu item extracts can be used between the automation controller and the remote control, for example as described above.

Figure 6:
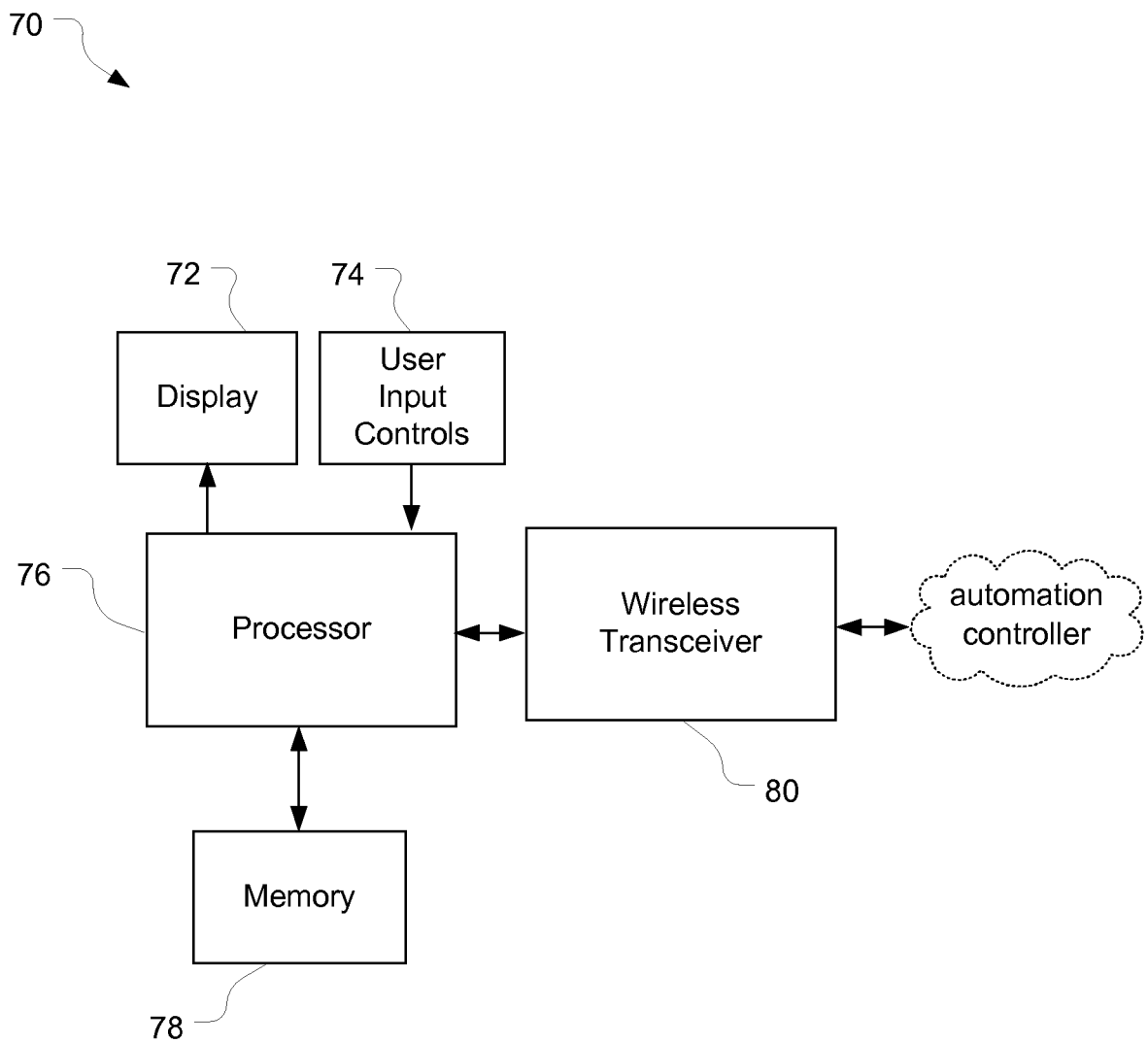
FIG. 6 is a block diagram of a detailed implementation of a remote control in accordance with an embodiment of the present invention.

Finally, a detailed example of a remote control is illustrated in FIG. 6, in accordance with an embodiment of the present invention. The remote control, shown generally at 70, includes a display 72 and user input controls 74. The display can include a touch screen which also serves as the user input controls. With a touch screen, various types of virtual or graphical controls can be implemented on the screen, such as a touch button, touch slider, touch rotary controls, and the like. For example, a representation of a slider control may be displayed using simple text, such as "<---0---->" where the '0' corresponds to the current position of the control. The control can respond to touch movements on the screen, moving the '0' back and forth to simulate the operation of a physical slider control.

A processor 76 is coupled to the display 72 and the user input controls 74, and can provide output to the display (such as displayed menus) and accept input from the user input controls (such as key presses, control activations, and the like). Various processor types can be used, including for example a microprocessor, microcontroller, discrete logic, FPGA, and ASIC.

The remote control 70 has a limited capacity memory 78, which can include RAM, NVRAM, ROM, PROM, EPROM, flash memory, and combinations thereof. The memory may be used to store limited numbers of menu items of limited length received from the automation controller, software to implement functions of the remote control, remote control configuration parameters, and information for operation of the remote control. The memory may be provided separately from the processor or may be included within the processor component.

The remote control 70 includes means for communicating capacity limits to the automation controller. For example, the processor 76 can generate and transmit a CONFIGURATION PARAMETERS message to the automation controller using a wireless transceiver 80. Various wireless communications approaches are described above which can be used in the remote control.

The remote control 70 also includes means for dynamically downloading a limited number of menu items of a limited length from the automation controller. For example, downloading can be performed using the wireless transceiver 80 using protocols as described above in FIGS. 4*a* and 4*b*. Downloading can be performed as the user navigates through the menu items, for example as described above.

It should be appreciated that one advantage of the remote control 70 provided is that the amount of memory required can be quite small, as the entire menu database need not be stored on the remote control. Furthermore, since menus are downloaded to the remote control only when required by the user, the amount of bandwidth required over the wireless link to the automation controller can be relatively small. Accordingly, complex wireless techniques are not required and the wireless transceiver 80 can be relatively simple. Both of these features help to reduce the cost of the remote control.

In summary, embodiments of the present invention can help to simplify cost and operation of a home automation network. By keeping a database of menu definitions at the automation controller, database maintenance is centralized and streamlined. Manual updating of remote controls is avoided, since database extracts are dynamically downloaded to the remote control when needed. Relatively low bandwidth wireless communication between the remote control and the automation controller can be used, since menu downloads need not occur except when a user is navigating the menus. Remote control cost can be reduced, since less memory is used. Multiple alternate menu representations can be included in the database, with selection being based on the capability of the remote control requesting menu information. This can allow for adaptation of displayed menus and control selections to the capabilities of individual remote controls.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of operating a remote control having a display in a home automation network having an automation controller, comprising the steps of:

communicating remote control configuration parameters related to menu display capabilities of the remote control from the remote control to the automation controller, the remote control configuration parameters including a remote control memory capacity and a list of available physical controls present on the remote control, wherein the automation controller controls lighting dimmers and switches, audio/visual equipment and climate control in response to control messages from the remote control, and wherein the automation controller is a network device separate from the remote control; and dynamically receiving database extracts from a menu database accessible by the automation controller at the remote control in response to menu navigation by a user, the database extracts defining displayable user interface menu elements and input control function mappings consistent with the remote control configuration parameters and comprising portions of the menu not currently displayed, wherein the automation controller sends the database extracts to the remote control in response to a request from the remote control for additional menu items that are not currently displayed but are adjacent to a displayed menu item, wherein the remote control sends the request for the additional menu items to the automation controller in response to a scroll movement to the additional menu items and based on an amount of cache memory available in the remote control, wherein a number of menu items and a length of each menu item are selected by the automation controller based on the remote control memory capacity, wherein the database extracts received are limited portions of the menu database, and wherein the input control function mappings are determined by the automation controller based on the communicated list of available physical controls present on the remote control.

2. The method of claim 1, further comprising the steps of:

displaying a selection-type displayable user interface menu item on the remote control display when an input control is activated which has been function mapped to a menu navigation function; and displaying a control-type displayable user interface menu item on the remote control display when an input control is activated which has been function mapped to a menu selection function.

3. The method of claim 2, wherein the selection-type displayable menu item comprises text strings.

4. The method of claim 2, wherein the control-type displayable menu item comprises a control type chosen from the group consisting of a touch slider, a touch switch, a push button, a slider, a toggle switch, a rotary knob.

5. The method of claim 1, wherein the step of dynamically receiving database extracts comprises fetching a displayable menu item for immediate display.

6. The method of claim 1, wherein the step of dynamically receiving database extracts comprises fetching a displayable menu item for storage.

7. The method of claim 1, wherein the step of dynamically receiving database extracts comprises fetching a control type for immediate display.

8. The method of claim 1, wherein the remote control configuration parameters comprise a display width limit.

9. The method of claim 1, wherein the remote control configuration parameters comprise a display height limit.

10. The method of claim 1, wherein dynamically receiving database extracts comprises dynamically receiving database extracts in response to menu scrolling by the user, the method further comprising overwriting existing database extracts with the database extracts received in response to menu scrolling by the user.

11. The method of claim 1, wherein the input control function mappings include a mapping of push buttons being mapped to volume up and volume down functions.

12. The method of claim 1, wherein the input control function mappings include a mapping of a blank control being mapped to lights.

13. The method of claim 1, wherein the remote control requests the additional menu items from the automation controller using a GET ITEM message.

14. The method of claim 1, wherein in response to the scroll movement to the portions of the menu not currently displayed, the remote control makes a number of requests for the additional menu items based on the amount of cache memory available in the remote control.

15. A method of control in a home automation network having an automation controller and a remote control having a limited capacity memory and a limited capacity display, the method comprising the steps of:

communicating remote control memory capacity parameters and a list of available physical controls present on the remote control from the remote control to the automation controller, wherein the automation controller controls lighting dimmers and switches, audio/visual equipment and climate control in response to control messages from the remote control, and wherein the automation controller is a network device separate from the remote control;

downloading menu items and input control function mappings from the automation controller to the remote control, a number of menu items and a length of each menu item selected by the automation controller based on the remote control memory capacity parameters and the input control function mappings determined by the automation controller based on the communicated list of available physical controls present on the remote control; and displaying at least one of the menu items on a display on the remote control;

changing the menu item displayed in response to user navigation commands; and downloading additional menu items from a menu database accessible by the automation controller in response to user navigation commands, wherein the additional menu items downloaded are limited portions of the menu database, wherein the automation controller sends the additional menu items to the remote control in response to a request from the remote control for the additional menu items that are not currently displayed but are adjacent to a displayed menu item, and wherein the remote control sends the request for the additional menu items to the automation controller in response to a scroll movement to the additional menu items and based on an amount of cache memory available in the remote control.

16. The method of claim 15, wherein the step of downloading additional menu items comprises:

obtaining a next menu item not currently displayed on the remote control; and storing the next menu item in the limited capacity memory.

17. The method of claim 16, wherein the step of storing the next menu item comprises overwriting a menu item currently stored in the limited capacity memory.

18. A home automation network comprising:

an automation controller coupled to a plurality of home automation network components for controlling the plurality of home automation network components, wherein the automation controller controls lighting dimmers and switches, audio/visual equipment and climate control in response to control messages from a remote control, and wherein the automation controller is a network device separate from the remote control;

a menu database accessible to the automation controller, the menu database defining user-navigable control menus to allow user control of the home automation network components, the menu database including a plurality of the user-navigable control menus; and the remote control in communication with the automation controller, the remote control being arranged to dynamically download input control function mappings and limited portions of one of the plurality of user-navigable control menus in the menu database from the automation controller in response to a user navigating through the menu database using the remote control, wherein the automation controller sends the plurality of user-navigable control menus to the remote control in response to a request from the remote control for additional menu items that are not currently displayed but are adjacent to a displayed menu item, wherein the remote control sends the request for the additional menu items to the automation controller in response to a scroll movement to the additional menu items and based on an amount of cache memory available in the remote control, wherein a selection of the one of the plurality of user-navigable control menus is based on remote control memory capacity limitations communicated from the remote control to the automation controller, wherein a number of menu items and a length of each menu item are selected by the automation controller based on the remote control memory capacity limitations, and wherein the input control function mappings are determined by the automation controller based on a list of available physical controls present on the remote control communicated from the remote control to the automation controller.

19. The home automation network of claim 18, wherein the remote control further comprises:
a display for displaying a selection from the menu database; and
a user-input control for accepting user input.

20. The home automation network of claim 18, wherein the menu database comprises a plurality of text strings.

21. The home automation network of claim 18, wherein the menu database comprises a plurality of control type identifiers.

22. The home automation network of claim 18, further comprising the plurality of home automation network components.

23. An automation controller for a home automation network for use with a remote control, the automation controller comprising:
a database storage having plural navigable menu items stored therein;
a processor for extracting menu items and input control function mappings from the database in response to a request from the remote control for additional menu items that are not currently displayed but are adjacent to a displayed menu item, wherein the remote control sends the request for the additional menu items to the automation controller in response to a scroll movement to the additional menu items and based on an amount of cache memory available in the remote control, wherein a number of menu items and length of menu items is based on remote control memory capacity limits, wherein the extracted menu items are limited portions of the database, and wherein the input control function mappings are determined by the automation controller based on a list of available physical controls present on the remote control; and
a transceiver for communicating extracted menu items to the remote control;
wherein the automation controller controls lighting dimmers and switches, audio/visual equipment and climate control in response to control messages from the remote control, and wherein the automation controller is a network device separate from the remote control.

24. A remote control for a home automation network for use with an automation controller having control of the home automation network, the remote control comprising:
a display device for displaying menu items to a user;
a transceiver for communicating a remote control memory capacity and a list of available physical controls present on the remote control to the automation controller and for dynamically downloading input control function mappings and a limited number of menu items of a limited length from the automation controller as a user navigates through the menu items, wherein the automation controller sends the input control function mappings and the limited number of menu items to the remote control in response to a request from the remote control for additional menu items that are not currently displayed but are adjacent to a displayed menu item, wherein the remote control sends the request for the additional menu items to the automation controller in response to a scroll movement to the additional menu items and based on an amount of cache memory available in the remote control, wherein the automation controller controls lighting dimmers and switches, audio/visual equipment and climate control in response to control messages from the remote control, wherein the automation controller is a network device separate from the remote control wherein the number of menu items and the length of each menu item are selected by the automation controller based on the remote control memory capacity, wherein the limited number of menu items are limited portions of a menu database accessible by the automation controller, and wherein the input control function mappings are determined by the automation controller based on the list of available physical controls present on the remote control.

25. The method of claim 13, wherein the GET ITEM message comprises a menu list ID and a menu item index for the additional menu items.

26. The method of claim 13, wherein the automation controller responds to the GET ITEM message with a SET ITEM message comprising the additional menu items.

* * * * *